United States Patent
Valdez

[19]

[11] Patent Number: 6,149,177
[45] Date of Patent: Nov. 21, 2000

[54] BICYCLE WHEEL FORK WITH REMOVABLE PEG BOSS

[75] Inventor: Robert Valdez, Carson, Calif.

[73] Assignee: Bear Corporation, Cerritos, Calif.

[21] Appl. No.: 09/175,038

[22] Filed: Oct. 19, 1998

[51] Int. Cl.[7] .................................................. B62H 1/00
[52] U.S. Cl. ............................................................. 280/291
[58] Field of Search .................................... 280/279, 291, 280/304.5; 403/256, 258, 260; 135/68, 69, 74, 75

[56] References Cited

U.S. PATENT DOCUMENTS

| | | | |
|---|---|---|---|
| 578,335 | 3/1897 | Hughes | 280/291 |
| 625,368 | 5/1899 | Thompson | 280/291 |
| 4,638,682 | 1/1987 | Michiyama | 74/560 |
| 4,771,651 | 9/1988 | Haro | 280/291 |
| 5,983,912 | 11/1999 | Leu | 135/66 |
| 6,010,140 | 1/2000 | Guynn | 280/291 |

*Primary Examiner*—Kevin Hurley
*Assistant Examiner*—Kevin McKinley
*Attorney, Agent, or Firm*—Charles H. Thomas

[57] ABSTRACT

A freestyle bicycle is provided with removable foot peg bosses that allow a rider to selectively attach and detach foot pegs on the legs of a bicycle fork. By providing the foot peg bosses as removable structures, uncomfortable outwardly projecting protrusions in the form of unused peg bosses which are characteristic of conventional foot peg systems are eliminated. A bolt is utilized to clamp the transverse end wall of a foot peg against a corresponding bearing surface of a removable foot peg boss while concurrently attaching the foot peg boss to the distal end of a selected fork leg. The shank of the bolt is threadably engageable with and disengageable from a peg boss support barrel that is mounted transversely within the tubular structure of a bicycle fork leg.

12 Claims, 4 Drawing Sheets

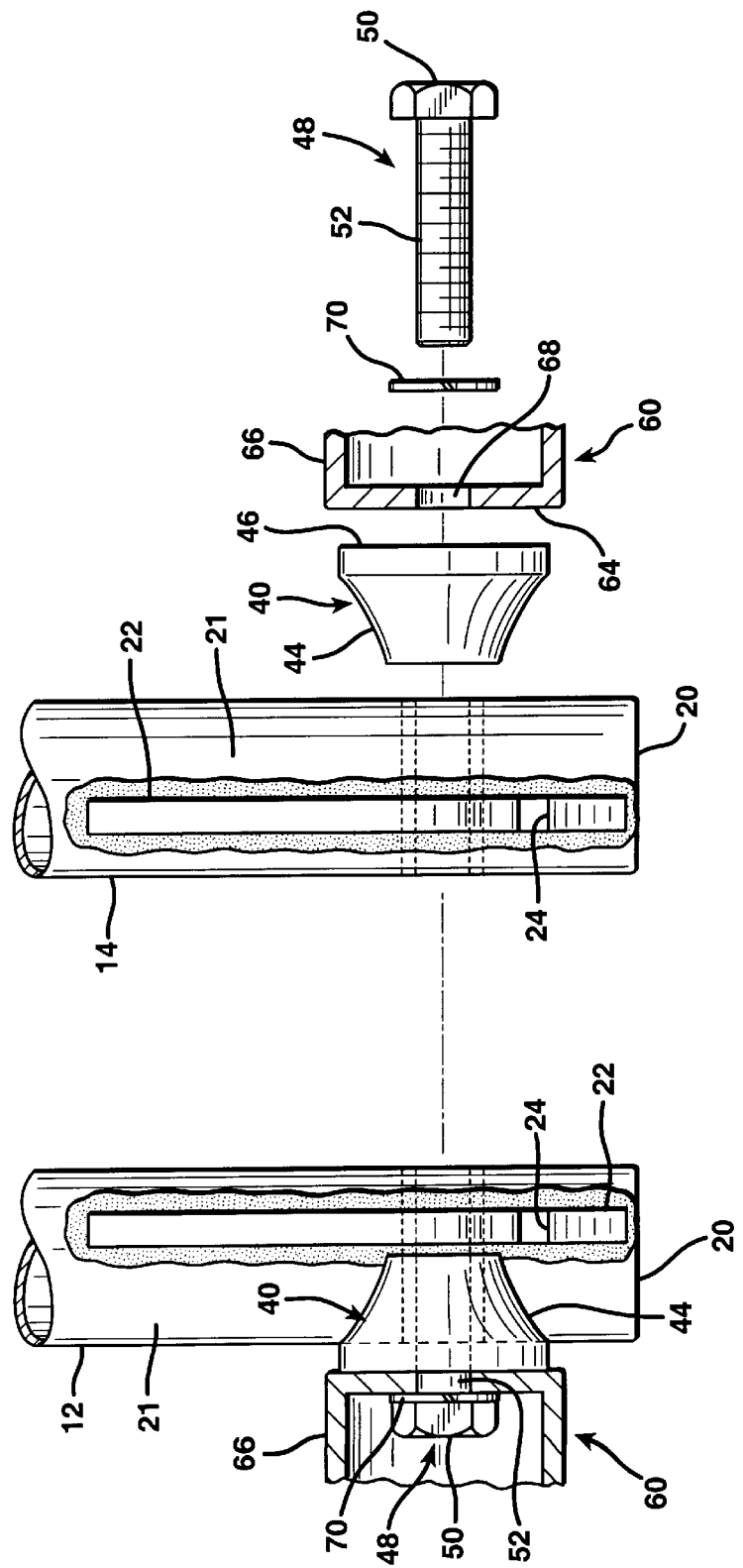

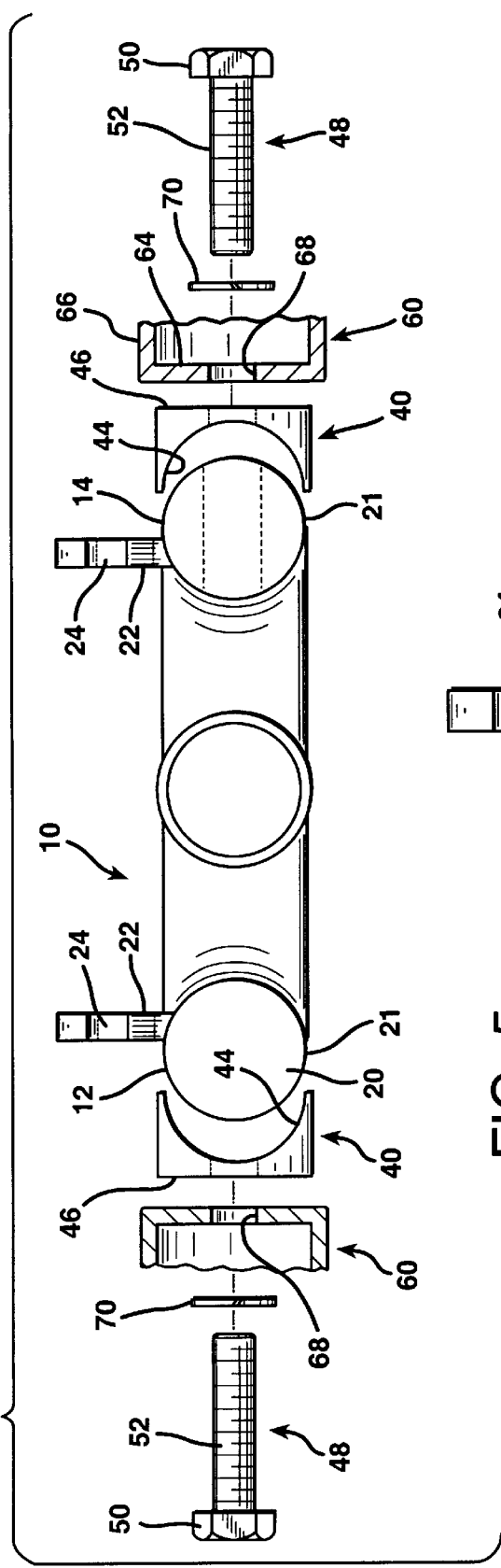

BICYCLE WHEEL FORK WITH REMOVABLE PEG BOSS

BACKGROUND OF THE INVENTION

1. Field of the Invention

While a bicycle, in its basic form, is a simple, two-wheeled form of transportation, the bicycle industry has evolved in special fields of interest that go far beyond a mere form of transportation. Indeed, different specialized types of bicycles have been developed for sports and hobbies involving bicycles. These different specialized types of bicycles include motocross bicycles, mountain bicycles, and freestyle bicycles.

2. Description of the Prior Art

Freestyle or flat land bicycles are often utilized for performing stunts and tricks wherein the cyclists does not remain seated and ride the bicycle with both wheels on the riding surface. Quite to the contrary, in freestyle performances the bicycle is often manipulated so that only one wheel contacts the riding surface, while the other wheel is raised in the air. Furthermore, the rider does not necessarily remain seated, but dismounts from the seat while remaining on the bicycle. For this purpose freestyle bicycles are sometimes provided with pegs that extend laterally from the bicycle frame or the fork legs of a bicycle fork in which a bicycle wheel is mounted. Indeed, some of the freestyle stunts that are performed involve standing on a laterally extending peg while riding the bicycle with one wheel lifted from the riding surface.

While foot peg are quite useful for performing bicycle stunts, they can get in the way. For this reason foot pegs are typically formed as removable structures or accessories that can be attached to or detached from a bicycle fork leg as desired. This allows a rider the option of either attaching the foot peg to the bicycle fork leg for use in performing stunts, or detaching the foot peg so that it does not become an obstruction.

Also, different riders prefer to utilize foot pegs at different locations on the bicycle. Some freestyle stunt riders utilize foot pegs projecting from both sides of the bicycle near the distal ends of both fork legs of both the front and rear bicycle forks. Other riders prefer to utilize foot pegs on only the front fork or on only the rear fork. Still other riders prefer to utilize a single stunt peg on a single side of the bicycle. Some riders prefer the front fork and others prefer the rear fork. A rider can thereby stand on a selected stunt peg to one side of the bicycle frame while still riding and controlling the bicycle.

Since foot pegs do project laterally outwardly from the bicycle fork legs, and since the preferences of freestyle riders as to the selected use and location of foot pegs varies widely, freestyle bicycle foot pegs are typically provided as removable equipment for freestyle bicycles.

In a conventional freestyle bicycle provision is typically made to accommodate foot pegs on both sides of each of the bicycle forks for both the front and rear wheels of the bicycle. So that the foot peg may be removable, each bicycle fork leg is each normally provided with a permanently installed mounting base called a peg boss. In a conventional bicycle the peg boss consists of a short boss or platform that has a flat bearing surface oriented parallel to the alignment of the fork leg and parallel to the plane of rotation of the wheel held between the fork legs. Opposite the flat bearing surface the peg boss is curved in a concave fashion to conform to the outer surface of the fork leg. The peg boss is then welded to the outer surface of the fork leg throughout the entire perimeter of surface contact between the peg boss and the fork leg. The peg boss thereupon becomes a permanent structure that projects outwardly from the fork leg in a direction opposite the location of the wheel between the fork legs.

The foot peg is fastened to the foot peg boss by means of a bolt that is inserted through the open end of the hollow, tubular foot peg. The underside of the head of the bolt bears against the flat, transverse end wall of the closed end of the foot peg. The shank of the bolt is threaded into an internally tapped opening that extends from the bearing surface of the foot peg boss through the structure of the foot peg boss, and into the structure of the fork leg.

In conventional freestyle bicycle wheel forks there are therefore two peg bosses on each fork, one on each fork leg. However, some riders use only one peg and some do not use pegs on the front fork, but do use pegs on the back fork. Nevertheless, in a conventional freestyle bicycle the four peg bosses remain as outwardly projecting protuberances from the fork legs even if no foot pegs are attached to them. When riders rest a foot or both feet on a bicycle foot peg, their legs often rub against the opposite fork legs in performing maneuvers. If a rider uses only one peg or only one peg on each fork, then the boss without a peg on the opposite fork leg or fork legs protrudes outwardly as an obstruction. The unused, but permanently mounted, peg bosses are uncomfortable at least, and can cause injury to the rider. Furthermore, the unused, but protruding, peg bosses are uncomfortable for a rider to grasp with the hand when carrying or working on a conventional freestyle bicycle.

Some riders who perform tricks mount their foot pegs on the ends of the axles of the bicycle and stand on them while maneuvering the frame through the air in rotation about the wheel upon which they are supported. The fork is often rotated 90° or more relative to the wheel supporting the rider. When the fork and frame are manipulated in this manner the unused peg bosses that are welded to the fork rotate into contact with the rider's shoe or ankle. This can detract from the smooth performance of the trick and also cause injury to the rider.

SUMMARY OF THE INVENTION

The present invention involves a system for eliminating the inconvenience and discomfort of unused peg bosses on a bicycle. Nevertheless, the system of the invention is still able to accommodate a foot peg at the distal extremity of some, any one, or all of the fork legs of the bicycle. This system is achieved by providing the peg bosses as removable articles which can, at the election of the user, either be attached to the fork leg or detached from the fork leg, as desired.

The peg bosses of the invention provide every advantage of permanently mounted peg bosses in that they provide firm, complete support to a foot peg attached thereto. Unlike conventional peg bosses, however, the peg bosses of the invention can be completely removed from the fork leg so that they present no inconvenient or uncomfortable protrusion from a fork leg upon which no foot peg is used. This allows a user to perform stunts and tricks without the possibility of injury from an unused peg boss, or the discomfort of contact with an unused peg boss. To the contrary, the surfaces of fork legs that do not bear any foot pegs are completely smooth, unlike conventional freestyle bicycle forks.

In one broad aspect the present invention may be considered to be an improvement in a bicycle fork having a pair of legs, each of which defines an axle seat to secure the axle of a bicycle wheel between the fork legs. The improvement is comprised of a removable peg boss located on at least one of the fork legs proximate the axle seat thereon.

Typically the fork legs of a freestyle bicycle each have a cylindrical annular cross section. The removable peg boss is formed with a saddle that seats against the cylindrical surface of the fork leg to project radially outwardly therefrom. A pair of diametrically opposed openings are formed in at least one of the fork legs. One of the diametrically opposed openings faces the other fork leg in the bicycle fork, while the other opening faces outwardly from the fork in an opposite direction. An internally threaded support barrel is mounted transversely within the fork leg and is secured thereto, preferably by welding, to extend between the diametrically opposed openings. A bolt having a shank passes through the peg boss and is threadeably engaged and tightened in the internally threaded barrel. The bolt has a head that releasably clamps the peg boss onto a fork leg having a support barrel thereon.

In another broad aspect the present invention may be considered to be an improvement in a freestyle bicycle fork having a pair of mutually parallel fork legs, each of which has a distal end with an axle seat thereon. The improvement is comprised of a removable peg boss detachably mounted on at least one of the fork legs so as to face outwardly away from the other of the fork legs.

In still another broad aspect the invention may be considered to be a wheel fork for a bicycle comprising a pair of fork legs extending parallel to each other and having free distal extremities and which receive a bicycle wheel therebetween, and a peg boss for at least one of the fork legs detachably mounted thereon. The peg boss has a flat bearing surface residing in a plane oriented parallel to the fork legs and to the bicycle wheel.

The invention may be described with greater clarity and particularity by reference to the accompanying drawings.

DESCRIPTION OF THE DRAWINGS

FIG. 3 is an exploded elevational detail, partially in section, illustrating removable peg bosses according to the invention.

FIG. 4 is an exploded end view, partially in section, illustrating the improved bicycle wheel fork of FIG. 1.

FIG. 5 is an elevational detail illustrating a prior art peg boss permanently installed on a bicycle fork leg.

DESCRIPTION OF THE EMBODIMENT

Figure 1:
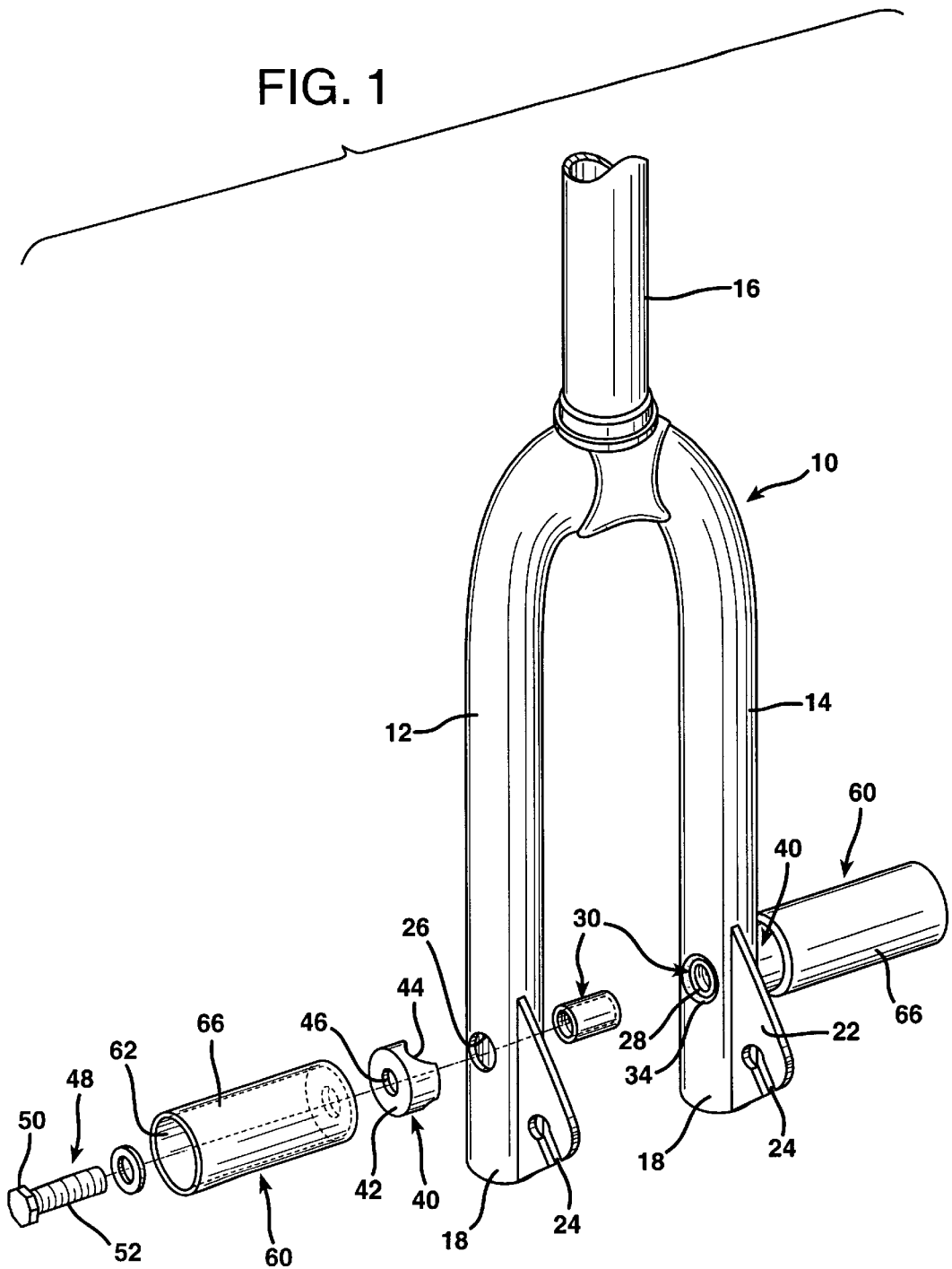
FIG. 1 is a perspective view of an improved bicycle wheel fork according to the invention.

FIG. 1 illustrates a freestyle bicycle wheel fork indicated generally at 10. The bicycle wheel fork 10 is fabricated from number 4130 heat-treated steel and formed with a pair of legs 12 and 14, which extend mutually parallel to each other throughout most of their lengths, but which curve at their upper extremities and are joined to a steering tube 16 in a conventional manner. The fork legs 12 and 14 are preferably hollow, tubular structures having an annular cross section with an outer cylindrical diameter of between one and one-quarter inches and two inches and a wall thickness of typically about 0.065 inches.

Each of the fork legs 12 and 14 terminates in a distal end 18, which has a transverse end closure 20 extending thereacross to enhance its structural rigidity. At each distal end 18 of each of the fork legs 12 and 14 there is a generally triangular-shaped axle seating plate 22 welded to the outer, cylindrical surface of the fork leg. The two seating plates 22 on the wheel fork 10 reside in mutually parallel orientation relative to each other, and perpendicular to the axle of a bicycle wheel that is located therebetween. Each of the axle seating plates 22 defines an axle dropout slot 24 within which an end of a bicycle axle may be seated.

Each distal end 18 of each of the fork legs 12 and 14 has a pair of diametrically opposed openings 26 and 28 defined therethrough. Each opening 26 and 28 is preferably five-eighths of an inch in diameter. The openings 28 in the fork legs 12 and 14 of the bicycle fork 10 face each other and also face toward a bicycle wheel located therebetween. On the opposite side of the fork legs 12 and 14 the openings 26 face outwardly in a direction away from the bicycle wheel.

Figure 2:
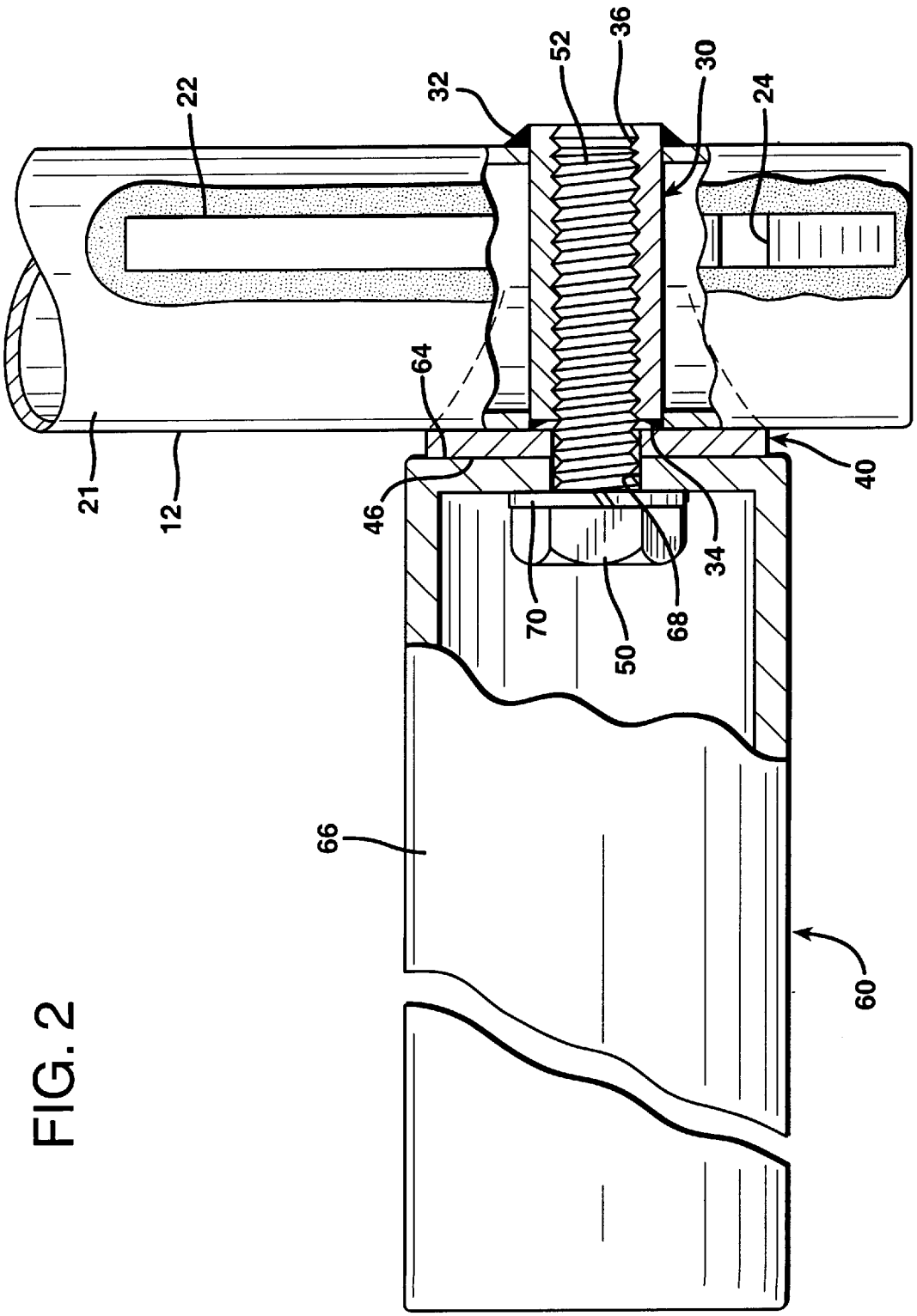
FIG. 2 is an elevational detail, partially in section, illustrating the removable peg boss of the invention.

A cylindrical annular, internally threaded peg boss support barrel 30 extends transversely across the width of each fork leg 12 and 14 is welded thereto. The inside end of each peg boss support barrel 30 extends entirely through the wall thickness at the opening 28 through the distal end 18 of the fork leg in which it is installed and is welded to the outer cylindrical surface 21 thereof by a weld 32 as illustrated in FIG. 2. The opposite, outer end of each peg boss support barrel 30 extends into the opening 26, but not entirely through the wall thickness of the fork leg. Rather, the outer end of each peg boss support barrel 30 is welded to the fork leg with an annular weld 34 around the circumference of the opening 26. The weld 34 can be recessed from the outer cylindrical surface 21 of each of the fork legs 12 and 14, as depicted in FIG. 2. Each peg boss support barrel 30 is internally threaded with a three-eighths inch diameter tapped bore 36 that extends diametrically across the fork leg in an orientation perpendicular thereto and perpendicular to the alignment of a wheel located between the fork legs 12 and 14.

Each of the fork legs 12 and 14 is provided with a removable peg boss 40 at its distal end 18. Each peg boss 40 has a flat, annular bearing surface 42 that faces outwardly away from the fork leg upon which it is mounted, and an inner, concave surface that forms a saddle 44 that is curved to conform to the shape of the cylindrical surface 21 of each fork leg. The saddle 44 serves as a concave seating surface. When the removable peg boss 40 is mounted on the fork 10, it contacts one of the legs 12 and 14 throughout the surface of its saddle 44.

The removable peg bosses 40 may be fabricated from aluminum, a hard plastic, or even steel, if desired. The peg bosses 40 are preferably fabricated of aluminum so as to minimize weight while maximizing strength. Preferably, the peg bosses 40 each weigh only about five ounces. Each of the removable peg bosses 40 also has a central, circular opening 46 therethrough which appears at the center of the bearing surface 42 thereof.

Each peg boss 40 is provided with a machine bolt 48 having a conventional hexagonal head 50 and a three-eighths inch diameter externally threaded shank 52. The peg boss bolts 48 preferably have a shank of between about one and three-quarter inches and two and one-half inches in length, depending upon the diameter of the fork legs 12 and 14.

The removable peg bosses 40 are provided for the purpose of mounting foot pegs 60, as illustrated in the drawing figures. The foot pegs 60 are each formed as a cylindrical, annular, hollow, tubular structure 66 open at one end 62 and closed by an annular end wall 64 welded across the opposite end of the tubular structure 66. A circular opening 68 is defined through the center of each foot peg annular end wall 64.

As perhaps best illustrated in FIGS. 2 and 3, the bolt 48 is utilized to secure both the foot peg 60 and the peg boss 40 to the distal end 18 of an associated fork leg 12 or 14. As shown in FIG. 2, the shank 52 of the bolt 48 extends through the opening 68 in the foot peg end wall 64 and also through the central opening 46 in the removable peg boss 40. The shank 52 of the bolt 48 extends into the peg boss support barrel 30 and is threadably engaged in the internally tapped central opening 36 therein.

When a foot peg 60 is mounted on one of the fork legs 12 or 14, the head 50 of the bolt 48 bears against the annular end wall 64 of the foot peg 60, and also against the peg boss 40 so as to clamp the end wall 64 of the foot peg 60 tightly against the bearing face 42 of the peg boss 40. A conventional disk-shaped annular washer 70 is interposed between the head 50 and the end wall 64 of the foot peg 60. The bolt 48 also clamps the removable peg boss 40 tightly against the outer cylindrical surface 21 of the fork leg 12 or 14 to which the peg boss 40 is removably attached. The shank 52 of each bolt 48 is thereby attached to one of the fork legs 12 or 14 from within, inside the peg boss support barrel 30.

As illustrated in FIG. 2, the bolt 48 is engageable with the peg boss support barrel 30 to clamp the flat end closure 64 of the foot peg 60 into tight, intimate contact with the flat bearing surface 42 of the foot peg boss 40 on those fork legs upon which the rider wants a foot peg 60 mounted. The bolts 48 may be secured to the peg boss support barrels 30 by means of a conventional socket wrench and extension. The bolts 48 are rigidly secured to tightly clamp a foot peg 60 against a peg boss 40 and simultaneously hold the peg boss 40 immobile upon the outer surface 21 of a selected fork leg 12 or 14. Due to the conforming curvature of the saddle 44 relative to the surfaces 21, the peg boss or bosses 40 cannot rotate relative to the fork legs 12 and 14 about the axes of the bolts 48.

On the other hand, an as illustrated in FIGS. 3 and 4, both the foot peg 60 and the foot peg boss 40 are completely removed from the bicycle fork 10 when the bolt 48 is disengaged from the peg boss support barrel 30. As a consequence, removal of the peg boss 40 from the cylindrical surfaces 21 of either or both of the fork legs 12 or 14 removes the protrusions that would otherwise extend outwardly from the bicycle fork 10.

In marked contrast, FIG. 5 illustrates a prior art system in which a peg boss 130 is permanently mounted on a fork leg 112 by means of a weld 113 extending around the perimeter of the surface of contact between the underside of the peg boss 130 and the outer cylindrical surface of the fork leg 112. It is evident from FIG. 5 that even though the foot peg 60 may be removed from the conventional peg boss 130, the peg boss 130 remains as an annoying protrusion on the outer cylindrical wall of the fork leg 12 or 14 to which it is attached.

By utilizing removable peg bosses 40 as illustrated in FIGS. 1–4, a rider can selectively attach a foot peg 60 to any one of the fork legs 12 or 14 and to a bicycle wheel fork for either the front wheel, the rear wheel, or both. In drawing FIGS. 2 and 3 removable peg bosses 40 are shown as being detachably mounted on both of the fork legs 12 and 14.

The bolts 48 may be disengaged from the peg boss support barrel 30 so that both the foot peg 60 and the peg boss 40 may be removed completely from the bicycle fork 10, as illustrated in FIG. 1. When the bolts 48 are disengaged from the tapped bores 36 in the peg boss support barrels 30, both the foot pegs 60 and the foot peg bosses 40 are completely removed from the bicycle fork 10 for storage and subsequent use, if desired. The peg boss support barrels 30, of course, remain in position within the structures of the fork legs 12 and 14 since they are welded thereto at both ends. The peg boss support barrels 30 thereby not only provide a means for mounting the foot pegs 60, but also serve to provide extra rigidity to the distal ends 18 of the fork legs 12 and 14 due to the transverse bracing that they provide.

When the bolt 48 is tightened the saddle 44 contacts the cylindrical outer surface 21 of the fork leg against which it positioned and immobilizes the peg boss 40 from rotation about the bolt 48 relative to the fork leg to which it is attached. This ensures that the peg boss 40 will not slip upon the surface 21, which could lead to injury to the rider.

The use of removable peg bosses according to the invention provides a bicycle stunt rider with greater versatility and selectivity in equipping a bicycle with foot pegs at the distal end or ends of any one or more selected fork legs. The rider is thereby able to eliminate a source of irritation in the form of unused, but still protruding peg bosses 130, characteristic of prior systems.

Undoubtedly, numerous variations and modifications of the invention will become readily apparent to those familiar with bicycle construction, especially the construction of freestyle bicycles. For example, since the peg bosses 40 are totally removable from the bicycle fork 10, they can be constructed in elongated lengths to serve not only to mount a foot peg, but to serve as the foot peg itself. That is, the removable foot peg bosses can be permanently attached to or formed as unitary structures with the foot pegs upon which a rider steps. More specifically, the end wall 64 of the foot peg 60 could be reconfigured so as to form the saddle 44, whereby the reconfigured foot peg would serve both as the foot peg and foot peg boss. Accordingly, the scope of the invention should not be construed as limited to this specific embodiment depicted and described.

I claim:

1. In a bicycle fork having a pair of legs of cylindrical, annular cross section, each of which defines an axle seat to secure the axle of a bicycle wheel between said fork legs, the improvement comprising a removable peg boss located on at least one of said fork legs proximate to and spaced from said axle seat thereon, wherein said removable peg boss is formed with a saddle that seats against said cylindrical surface of said at least one fork leg to project radially outwardly therefrom, and further comprising a pair of diametrically opposed openings formed in said at least one of said fork legs at a location displaced from said axle seat thereof, wherein one of said diametrically opposed openings faces said other of said fork legs, an internally threaded support barrel mounted transversely and entirely within said at least one fork leg and permanently secured thereto to extend between and into both of said diametrically opposed openings, and a bolt having a shank passing through said peg boss and threadably engaged and tightened in said internally threaded barrel and having a head that releasably clamps said peg boss onto said at least one of said fork legs.

2. A bicycle fork according to claim 1 wherein said support barrel is welded to said at least one fork.

3. A bicycle fork according to claim 1 further comprising a hollow foot peg formed as a hollow tube with opposing ends, and said hollow tube is open at one of said opposing ends and has an end closure with an aperture therethrough at the other of said opposing ends, and said hollow foot peg is disposed against said removable peg boss with said bolt head bearing against said end closure and clamping said foot peg against said removable peg boss.

4. A bicycle fork according to claim 1 wherein each of said fork legs is provided with a separate peg boss as aforesaid.

5. In a freestyle bicycle fork having a pair of mutually parallel fork legs each having a tubular annular cross section with an outer cylindrical surface and each having a distal end with an axle seat thereon, and at least one fork leg is perforated by diametrically opposed apertures through said distal end thereof at a location displaced from said axle seat thereof, the improvement comprising a removable peg boss detachably mounted on said at least one of said fork legs so as to face outwardly away from the other of said fork legs, wherein said peg boss is provided with a saddle that conforms to the shape of said outer cylindrical surface, an internally threaded peg boss support barrel transversely mounted entirely within said at least one fork leg so as to extend into said diametrically opposed apertures thereof and said barrel is rigidly secured to said at least one fork leg, and a bolt with a head and a shank threadably engageable with and disengageable from said peg boss support barrel, and when said bolt shank is threadably engaged in said support barrel, said bolt head clamps said peg boss against said cylindrical surface of said at least one of said fork legs and said shank is attached to said at least one of said fork legs from within.

6. A freestyle bicycle fork according to claim 5 wherein said peg boss support barrel is welded to said at least one fork leg at each of said apertures therethrough.

7. A freestyle bicycle fork according to claim 5 further comprising peg bosses detachably mounted on both of said fork legs as aforesaid.

8. A wheel fork for a bicycle comprising a pair of fork legs extending parallel to each other and having free distal extremities with axle seats therein, wherein said fork legs are hollow with diametrically opposed coaxially aligned openings in said distal extremities thereof displaced from said axle seats, and said fork legs receive a bicycle wheel therebetween, an internally threaded, annular peg boss support barrel mounted entirely within said distal extremity of at least one of said fork legs and extending into said diametrically opposed openings therein, a peg boss defining a saddle that conforms to the shape of said at least one of said fork legs and said peg boss has a flat circular bearing surface residing in a plane oriented parallel to the alignment of said fork legs and to said bicycle wheel, a central opening that extends from said flat, circular bearing surface entirely through said peg boss, and a bolt releasably engageable with said peg boss support barrel and passing through said central opening in said peg boss to releasably secure said peg boss to said peg boss support barrel.

9. A wheel fork according to claim 8 wherein said fork legs have convex cylindrically-curved outer surfaces and said peg boss has a concave seating surface curved to conform to said cylindrically-curved outer surfaces of said fork legs, thereby forming said saddle which contacts said at least one fork leg and immobilizes said peg boss from rotation about said bolt relative to said at least one fork leg.

10. A wheel fork according to claim 8 wherein said peg boss support barrel is welded to said at least one fork leg.

11. A wheel fork according to claim 10 wherein said peg is a hollow, tubular structure open at one end and closed at the other by a flat, annular end closure, and said bolt is engageable to clamp said flat end closure of said foot peg into contact with said flat bearing surface of said foot peg boss.

12. A wheel fork according to claim 11 further comprising a peg boss support, a peg boss, a bolt, and a foot peg as aforesaid for each of said fork legs.

\* \* \* \* \*